United States Patent [19]

Nagasaka et al.

[11] Patent Number: 5,055,058
[45] Date of Patent: Oct. 8, 1991

[54] DEVICE FOR CHECKING FOR INCOMPLETE LOCKING OF CONNECTOR HOUSINGS

[75] Inventors: Yasuhiro Nagasaka; Hiromichi Shigenobu; Kazuyuki Shiraki; Motomi Iyoda, all of Aichi; Akira Maeda, Shizuoka, all of Japan

[73] Assignee: Yazaki Corporation, Tokyo, Japan

[21] Appl. No.: 523,492

[22] Filed: May 14, 1990

[30] Foreign Application Priority Data

May 30, 1989 [JP] Japan ................ 1-61907[U]

[51] Int. Cl.$^5$ .................. H01R 29/00; H01R 31/08
[52] U.S. Cl. .................. 439/188; 439/509; 439/513; 439/353
[58] Field of Search ........... 439/507, 509, 510, 511, 439/512, 513, 188, 488, 489

[56] References Cited

U.S. PATENT DOCUMENTS 4,059,320 11/1977 Piaget ........................ 439/511
4,871,323 10/1989 Ohsumi ................... 439/513 X
4,900,267 2/1990 Nagasaka et al. ............ 439/489

FOREIGN PATENT DOCUMENTS 61-169974 10/1986 Japan.

Primary Examiner—Larry I. Schwartz
Assistant Examiner—Julie R. Daulton
Attorney, Agent, or Firm—Armstrong, Nikaido, Marmelstein, Kubovcik & Murray

[57] ABSTRACT

An automatic lock checking device for a wire harness connector having short-circuiting female and male terminals for checking for incomplete locking thereof, including a diagnostic resistance-containing circuit connected parallel with a circuit containing a sensor and having the positive and negative sides thereof connected through conducting terminals of the connector to a load or an electronic control unit adapted to process input signals from the sensor. The automatic lock checking device includes at least a pair of short-circuiting terminals connected in series in the diagnostic resistance circuit and arranged to be short-circuited when the connector is completely locked.

1 Claim, 5 Drawing Sheets

DEVICE FOR CHECKING FOR INCOMPLETE LOCKING OF CONNECTOR HOUSINGS

BACKGROUND OF THE INVENTION

1. Field of the Invention

This invention relates to a wire harness connector with a function of detecting incomplete or erroneous locking of the connector, which can be suitably used for making connections in electric wiring of an automobile air bag system or the like, and to a device for automatically checking for erroneous or incomplete locking of such connectors.

2. Description of the Prior Art

In the devices which directly concern the safety of human life like automobile air bag systems, occurrences of incomplete locking of connectors or contact failures between male and female terminal elements are not permissible.

From this point of view, Japanese Laid-Open Utility Model Application 61-169974 discloses a harness connector which has a function of detecting incompletely locked connector conditions as shown in FIGS. 6A and 6B. In these figures, indicated at M is a male conector housing which is provided with a locking arm 1 with a projection 1a, and at F is a female housing which is provided with a locking projection 2. Fitted in these male and female housings M and F are a plural number of pairs of conducting female and male terminal elements 3 and 4 which are anchored in the respective compartments 5 and 6 by means of anchor arms 7 and 8, respectively. Of the plural number of pairs of female and male terminal elements 3 and 4, at least one pair of female and male terminals which are indicated at $3_1$ and $3_2$ are provided with bent portions 9 and 9' at the respective fore ends to serve as short-circuiting terminals (male terminals) for detection of an incompletely locked state. The bent portions 9 and 9' are brought into face-to-face contact with each other only when the female and male housings F and M are coupled with each other completely, namely, only when the two housings are coupled with each other completely until the projection 1a on the locking arm 1 is interlocked with the locking projection 2, whereupon current is conducted through wires W and W' connected to the short-circuiting terminals $3_1$ and $3_2$ thereby to check for incomplete locking.

As described above, the prior art connector is constructed in such a manner as to bring the bent portions 9 and 9' of the short-circuiting terminals $3_1$ and $3_2$ into face-to-face contact with each other in the coupling direction of the two housings F and M. However, considering the need for providing a play c (a gap space) between the projection 1a of the locking arm 1 and the locking projection 2 which constitute the locking means, there are possibilities of contact failures or conduction failures due to relative staggering mvoements of the two housings F and M or of the terminal elements $3_1$ and $3_2$ anchored in the compartments 5 and 6 or due to disengagement of or insufficient contact pressure on the bent portions 9 and 9'. Such unstable situations also occur when either one of the short-circuiting terminals $3_1$ and $3_2$ is fitted in a tilted posture or when the bent portion 9 or 9' is deformed.

SUMMARY OF THE INVENTION

Under these circumstances, it is an object of the present invention to provide a wire harness connector which can constantly maintain a stable contacting state despite relative staggering movements of the female and male housings or of the short-circuiting terminals serving for detection of incomplete locking of connector housings.

It is another object of the present invention to provide a device for automatically detecting the incompletely locked state of wire harness connector housings, which can reduce the wires (sensor circuits) to a minimum necessary number and check for disconnections in wires including conducting terminals when applied, for example, to an automobile air bag system.

In accordance with the present invention, there is provided an automatic lock checking device for a wire harness connector having short-circuiting female and male terminals for checking for incomplete locking thereof, including a diagnostic resistance-containing circuit connected parallel with a circuit containing a sensor and having the positive and negative sides thereof connected through conducting terminals of the connector to a load or an electronic control unit adapted to process input signals from the sensor, characterized in that the lock checking device comprises: at least a pair of short-circuiting terminals connected in series in the diagnostic resistance circuit and arranged to be short-circuited when the connector is in completely locked state.

The automatic lock checking device of the invention can be applied, for example, to a wire harness connector of the type which is composed of female and male housings adapted to be disengageably coupled with each other, a plural number of pairs of conducting female and male terminals fitted in the female and male housings, and locking means for holding the two housings in coupled state, at least one pair of the female and male terminals being formed as short-circuiting terminals for detection of incomplete locking of the housings. An automatic lock checking function is imparted to such a wire harness connector by providing: a pair of short-circuiting terminals, one of the short-circuiting terminals being in the form of a resilient tongue member capable of resilient deformation in upward and downward directions or in sideward directions and the other one being in the form of a fixed contact member; a lock confirming portion provided at a free end of the resilient tongue member; a tapered guide portion provided on the inner wall surface of a compartment accommodating the fixed contact member for guidance of the lock confirming portion; the resilient tongue member being kept from the fixed contacting member while the connector is in incompletely locked state by engagement of the lock confirming portion with the guide portion, and capable of restoring an original state by resiliency for contact with the fixed contact member when the connector is completely locked by disengagement of the lock confirming portion from the guide portion.

The above and other objects, features and advantages of the invention will become apparent from the following description and the appended claims, taken in conjunction with the accompanying drawings which show by way of example preferred embodiments of the invention.

DESCRIPTION OF PREFERRED EMBODIMENTS

Figure 1:
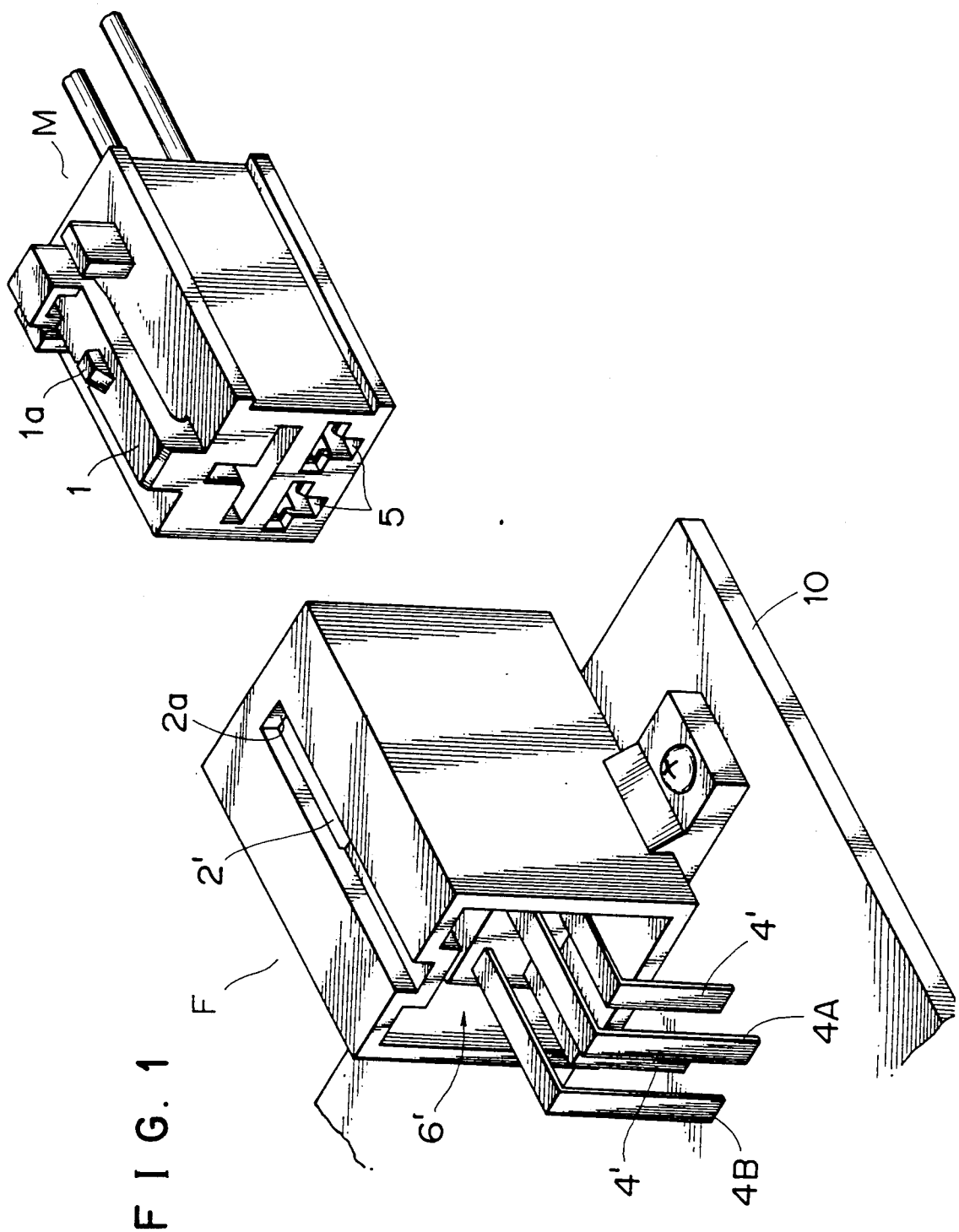
FIG. 1 is a perspective view of a wire harness connector according to the present invention, showing male and female housings of the connector in uncoupled state.
Figure 2:
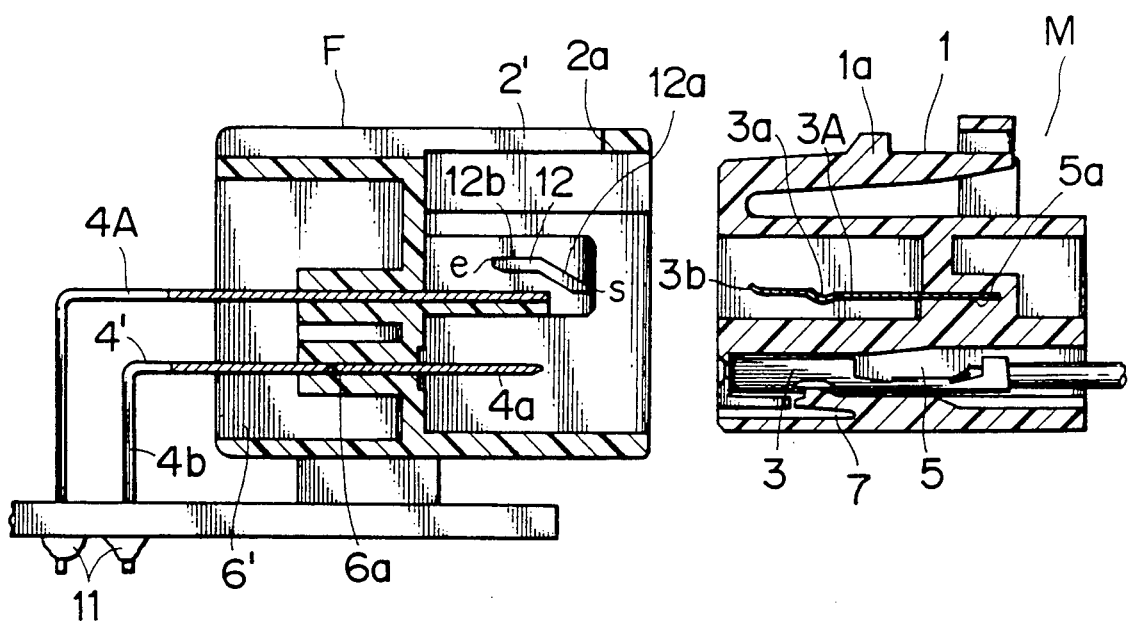
FIG. 2 is a longitudinal section of the connector of FIG. 1.

Hereafter, the invention is described in greater detail by way of the preferred embodiments shown in the drawings.

Referring first to FIGS. 1 to 4, denoted at M is a male connector housing which is provided with a locking arm 1 with a projection 1a in a peripheral wall portion thereof and which has female terminal elements 3 anchored in internal compartments 5 by means of anchor arms 7. On the other hand, indicated at F is a female connector housing which is provided with a locking projection 2a for interlocking engagement with the projection 1a and which accommodates therein male terminal elements 4' to make pairs with the female terminals 3 in the manner well known in the art.

In this particular embodiment of the invention, the male terminals 4' are in the form of L-shaped terminal elements which are directly mounted on a wiring board, each having a body portion 4a fixedly received in a fit-in hole 6a of a compartment 6' in the female housing F by press-in fit and a bent leg portion 4b fixed by soldering to a circuit conductor of a printed wiring board, which is not shown.

Figure 3:
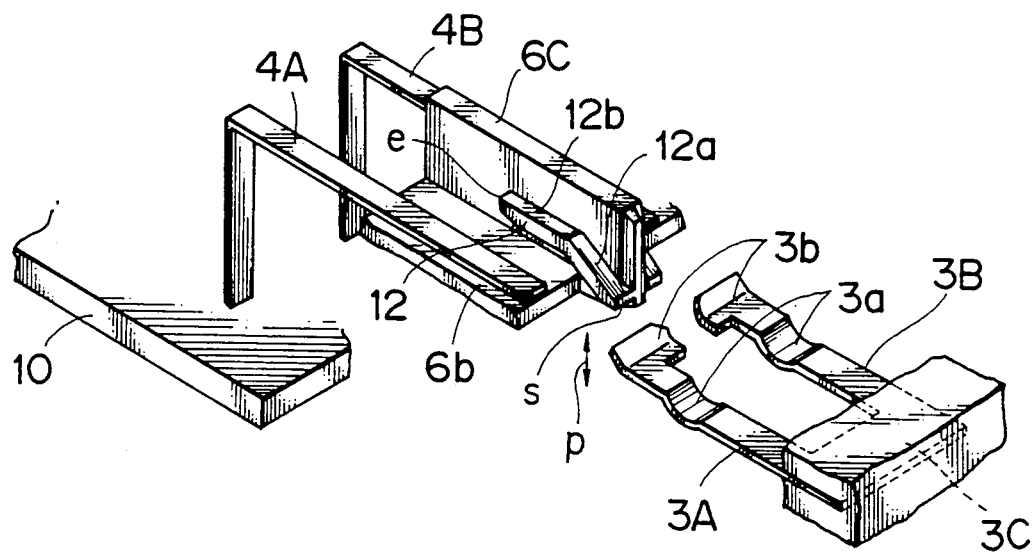
FIG. 3 is a perspective view on an enlarged scale of major component parts of the connector.

Among the plural number of pairs of the female and male terminal elements 3 and 4', the terminals indicated by references 3A, 3B, 4A and 4B are provided in the form of resilient tongue members and fixed contact members as shown particularly in FIG. 3, respectively.

The resilient tongue members 3A and 3B are each provided with an arcuately curved portion 3a in its intermediate portion and an inwardly projecting L-shaped lock confirming portion 3b at its free end. The base ends of the resilient tongue members 3A and 3B are connected with each other in a loop-like form by means of a common base plate 3c which is fixedly retained in a fit-in groove 5a of the male housing M by press-in fit. Consequently, the resilient tongue members 3A and 3B are resiliently deformable in the directions indicated by arrow P.

The fixed contact members 4A and 4B which are positioned side by side are supported on bottom wall portions 6b of terminal compartments 6' of the female housing F which is provided with a tapered guide portion 12 along the partition wall 6C between the terminal compartments 6' for engagement with the lock confirming portion 3b of the resilient tongue members 3A and 3B.

In the course of coupling the two connector housings F and M with each other, the guide portion 12 blocks the contact between the resilient tongue member 3A (3B) and the fixed contact member 4A (4B) until the two housings reach a completely coupled state (a completely locked state). Accordingly, the guide portion 12 has the fore initial end s of a tapered surface 12a located in such a position as to scoop up the lock confirming portion 3b of the resilient tongue member 3 before the female and male terminal elements 3 and 4' come into contact with each other, and the terminal and e of a horizontal surface 12b of the guide portion 12 is located in such a position as to permit the lock confirming portion 3b to ride over and disengage from the horizontal surface 12b when the two housings F and M are completely coupled with each other. Instead of providing the horizontal surface 12b, the tapered or sloped surface 12a may be extended as far as the terminal end e if desired.

Figure 6A:
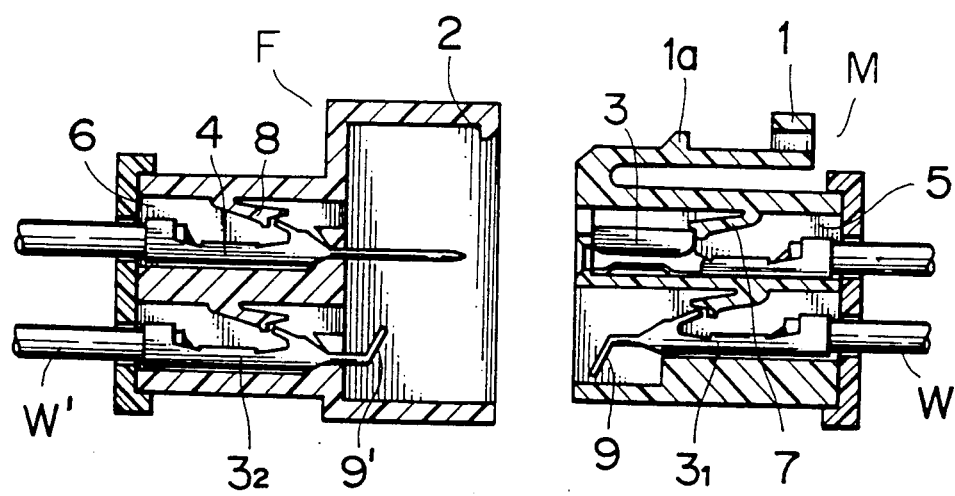
FIGS. 6A and 6B are longitudinal sections of a conventional wire harness connector, showing the connector housings in uncoupled and coupled states, respectively.
Figure 6B:
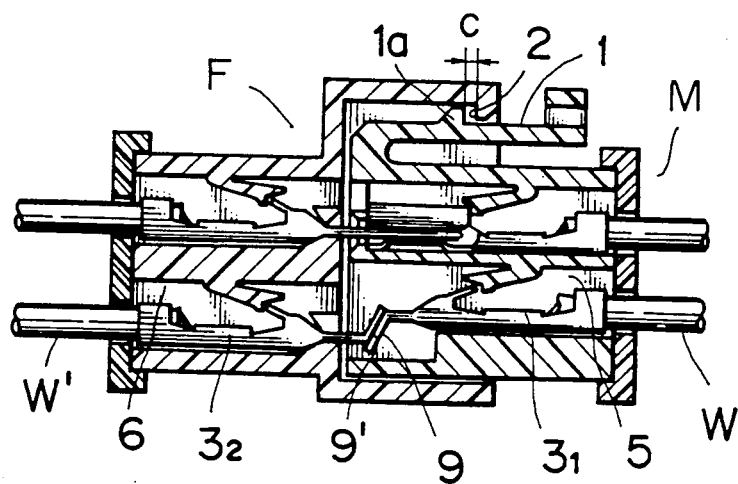

The resilient tongue members 3A and 3B which are connected in a loop-like form by the common base plate 3C in this embodiment may be arranged to form an independent terminal with a wire connection thereto like the conventional male terminal $3_1$ or $3_2$ (FIGS. 6A and 6B). The fixed contact member 4A (4B) to be engaged with the resilient tongue member 3A (3B) is not restricted to the direct-mount type, and may be of an ordinary type like the male terminal element 4 (FIGS. 6A and 6B).

The above-described wire harness connector of the invention functions in the manner as follows.

Figure 4A:
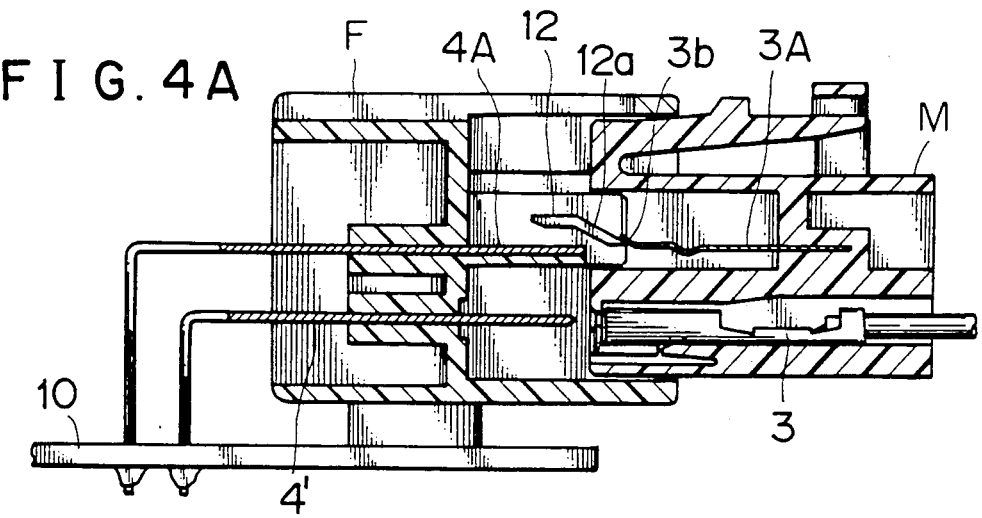
FIGS. 4A to 4C are diagrammatic sectional views explanatory of operational functions of the connector.

Upon fitting the male connector housing M into the female housing F which is connected to and fixed on a printed wiring board 10 as shown in FIG. 4A, the lock confirming portion 3b of the resilient tongue member 3A (3B) is scooped onto the tapered surface 12a of the tapered guide portion 12. A this time point, the female and male terminals 3 and 4' still do not begin to contact with each other.

Figure 4B:
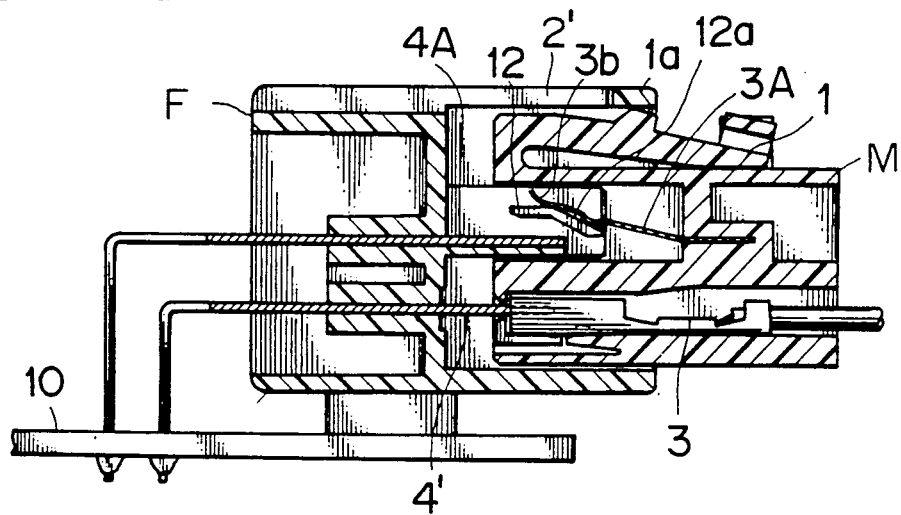

As the male housing M is fitted deeper into the female housing F as shown in FIG. 4B, the lock confirming portion 3b is guided further along the tapered surface 12a, and consequently the resilient tongue member 3A (3B) is flexed upward to evade its contact with the fixed contact member 4A (4B). On the other hand, the male terminal elements 4' are fitted into the corresponding female terminal elements 3 to initiate electric connection therebetween. At this time, the locking arm 1 is flexed downward with the projection 1a in an incompletely locked state, namely, still not in engagement with the locking hole 2'.

Figure 4C:
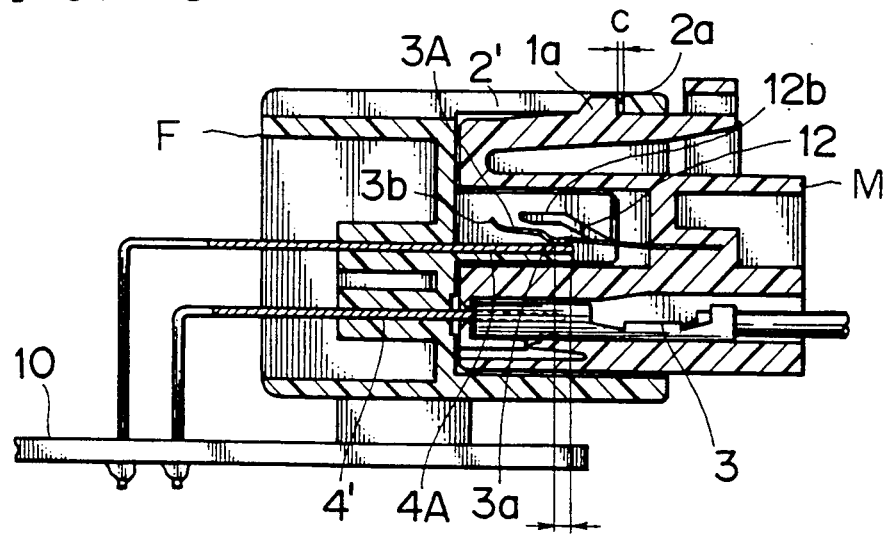

FIG. 4C shows the connector housings in a completely coupled (locked) state. Namely, as the male housing M is completely fitted, the projection 1a of the locking arm 1 reaches the locking hole 2' to engage therein, thereupon the locking arm 1 is permitted to flex back by resiliency and completely locked by interlocking engagement of the projection 1a with fore end wall 2a of the locking hole 2'. Concurrently, the lock confirming portion 3b rides over the horizontal surface 12b and disengages from the guide portion 12, and as a result the resilient tongue member 3A (3B) flexes back and restores the original state by its resiliency, holding the arcuate portion 3a in pressed contact with the fixed contact member 4A (4B).

In a case where the resilient tongue members 3A and 3B are connected in a loop-like form as in the present embodiment, a circuit is immediately completed between these members and the printed wiring board upon contact with the fixed contact members 4A and 4B, so that incomplete or complete locking can be detected by way of an alarm lamp which is inserted in that circuit.

Further, despite the play c which is provided between the projection 1a of the locking arm 1 and the end wall 2a, there is no possibility of contact failures between the resilient tongue member 3A (or arcuate portion 3a) and the fixed contact member 4A since they are contacted with each other over a sufficient lap width d as shown in FIG. 4C. It follows that they are held stably in contact with each other without influence by ordinary relative staggering movements of the two housings F and M or by a slight degree of deviations in posture of insertion or staggering movements of the resilient tongue member 3A.

Figure 5:
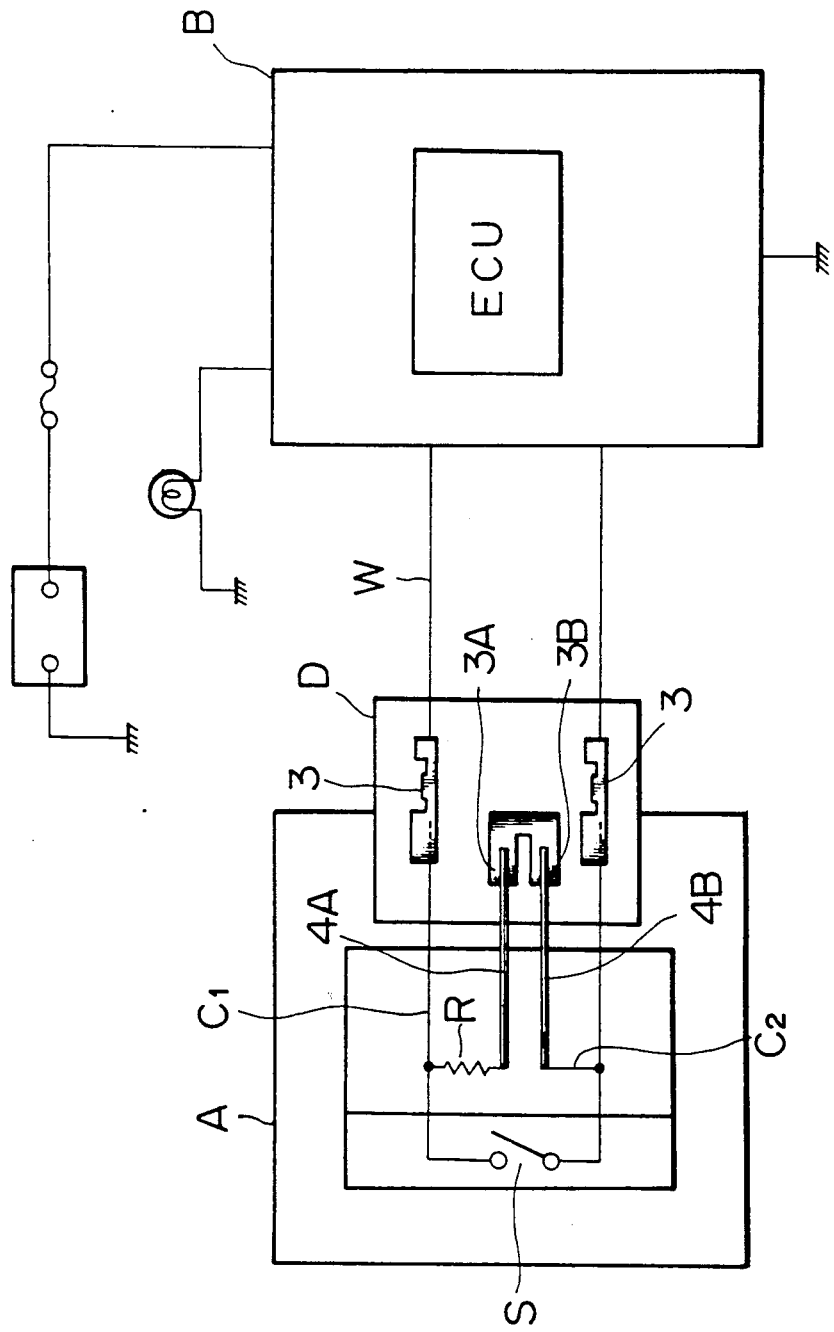
FIG. 5 is a diagrammatic illustration of an automatic connector lock sensor according to the invention.

Illustrated in FIG. 5 is a device for automatically checking for incomplete locking by the use of the above-described harness connector. In this figure, indicated at A is a sensor section of an air bag system, and at B is a main control unit of the air bag system. The sensor section A includes a circuit $C_1$ containing a sensor S and a circuit $C_2$ containing a diagnostic resistance R and connected in parallel with the circuit $C_1$, while the main unit B includes an electronic control unit ECU for processing input signals from the sensor S and detecting feeble current in the circuit $C_2$.

A wire harness connector D according to the present invention is fitted in the sensor section A such that the positive and negative sides of the sensor circuit $C_1$ are connected to the conducting female terminals 3 of the connector D, respectively.

The short-circuiting terminals for detection of incomplete locking, namely, the fixed contact members 4A and 4B and the resilient tongue members 3A and 3B are connected in series in the diagnostic resistance circuit $C_2$.

When the sensor (switch) S is turned on as a result of a car crash, for example, current which has been supplied to the circuit from the wire W flows through the completed sensor circuit $C_1$ and whereupon an air bag device (not shown) which is provided in the vicinity of the driver's seat is actuated by a command from ECU of the main unit B.

While the switch S is in open state, the feeble current flowing to the female terminals 3 through the short-circuiting terminals inserted in the circuit $C_2$ is detected by the electronic control unit ECU to check for a disconnection or contact failure.

It will be appreciated from the foregoing description that the harness connector of the invention with the above-described lock checking mechanism is capable of maintaining the contact between the lock checking short-circuiting terminals (resilient tongue members and fixed contact members) constantly in a stabilized fashion without influenced by the posture of insertion of the terminals or relative staggering movements of the female and male connector housings, while permitting to check exactly the lock condition of the connector.

Moreover, the lock checking device for the harness connector according to the invention is arranged to connect the short-circuiting terminals within the connector without necessitating external wiring and in series with a circuit containing the conducting terminals in the connector, so that it is capable of simultaneously checking for a disconnection in addition to compactness and simplicity in construction.

What is claimed is:

1. An automatic lock checking device for a wire harness connector having first and second connector bodies, the lock checking device comprising:

a connector lock sensor circuit including a diagnostic resistance-containing circuit connected parallel with a circuit containing a sensor and having positive and negative sides connected through terminals to a load and an electronic control unit adapted to process input signals from said sensor;

a first pair of terminals mounted in the first connector body and short-circuited internally of said first connector body for providing electrical connection between each of said first pair of terminals; and a second pair of terminals mounted in the second connector body, said second pair of terminals being connected with said lock sensor circuit and formed for electrical connection with said first pair of terminals upon complete insertion of one of said connector bodies into the other connector body to automatically actuate said lock sensor circuit upon electrical connection with said first pair of terminals and thereby automatically indicate that said first and second connector bodies are connected.

* * * * *